United States Patent
Huang

[19]

[11] Patent Number: 5,831,171
[45] Date of Patent: Nov. 3, 1998

[54] ELECTRONIC PRESSURE GAUGE FOR AUTOMATICALLY CONTROLLING THE FLUID PRESSURE OF A CONTROLLED DEVICE WITH A PREDETERMINED RANGE

[76] Inventor: Tien-Tsai Huang, No. 4-2, Lane 30, Wu Chuan St., Pan Chiao City Taipei, Taiwan

[21] Appl. No.: 845,850

[22] Filed: Apr. 28, 1997

[51] Int. Cl.⁶ ........................................................ G01L 9/00
[52] U.S. Cl. .......................................... 73/753; 137/487.5
[58] Field of Search ................................. 137/487.5, 505; 73/753

[56] References Cited

U.S. PATENT DOCUMENTS

| | | | |
|---|---|---|---|
| 4,174,729 | 11/1979 | Roark et al. | 137/487.5 |
| 4,469,099 | 9/1984 | McEwen | 128/327 |
| 5,188,411 | 2/1993 | Golden | 137/487.5 |

Primary Examiner—George M. Dombroske
Assistant Examiner—Joseph L. Felber
Attorney, Agent, or Firm—Bacon & Thomas

[57] ABSTRACT

An electronic pressure gauge including a housing, a fluid pressure converter for converting the pressure of the test fluid into a voltage, an electronic low pressure point setting device for setting the desired low pressure point, an electronic high pressure point setting device for setting the desired high pressure point, an electronic low pressure point comparator for comparing the set low pressure point with the voltage of the fluid converter, an electronic high pressure point comparator for comparing the voltage of the fluid converter with the set high pressure point, and a control signal output device adapted to provide different output signals subject to the comparison result of the electronic low pressure point comparator and the electronic high pressure point comparator.

4 Claims, 3 Drawing Sheets

ELECTRONIC PRESSURE GAUGE FOR AUTOMATICALLY CONTROLLING THE FLUID PRESSURE OF A CONTROLLED DEVICE WITH A PREDETERMINED RANGE

BACKGROUND OF THE INVENTION

The present invention relates to an electronic pressure gauge, and more particularly to such an electronic pressure gauge which can be set to control the pressure of a fluid within a predetermined pressure range.

In a factory, the pressure of a fluid or gas may have to be properly controlled within a certain range, for example, between 40 pounds/square inch to 50 pounds/square inch. When the pressure of the fluid or gas drops below 40 pounds/square inch, the pump must be turned on to pump the fluid or gas into the pressure tank. On the contrary, when the pressure of the fluid or gas reaches 50 pounds/square inch, the pump must be stopped. FIG. 1 shows a pressure control meter 10 designed for this purpose. The pressure control meter 10 comprises a fluid input port 12, a pressure converter (not shown, adapted for converting the fluid pressure into a mechanical displacement), a dial 13, a pressure index 14, a low pressure point index 16, a high pressure point index 18, a voltage input line 19, a low pressure signal output line 166 and a high pressure signal output line 186. The fluid input port 12 is connected to for example a pressure tank. The pressure index 14 indicates the fluid pressure of the pressure tank. A low pressure point setting control lever 164 and a high pressure point setting control lever 184 are respectively connected to the low pressure point index 16 and the high pressure point index 18 at the top for the setting of the desired low pressure point and high pressure point. A low pressure point probe 162 and a high pressure point probe 182 are respectively connected to the low pressure point index 16 and the high pressure point index 18 for touching by the pressure index 14. The voltage input line 19 is connected to the pressure index 14. The low pressure signal output line 166 is connected to the low pressure point index 16. The high pressure signal output line 186 is connected to the high pressure point index 18. The voltage input line 19 provides a voltage for example +5 V to the pressure index 14. When the pressure index 14 is spaced between the low pressure point index 16 and the high pressure point index 18, it does not touch the low pressure point index 16 or the high pressure point index 18, therefore the low pressure signal output line 166 and the high pressure signal output line 186 provide a respective zero output. When the pressure index 14 reaches the set high pressure point, it touches the high pressure point index 182, causing a voltage of +5 V to be produced at the high pressure signal output line 186. When the pressure reduces, the pressure index 14 is moved away from the high pressure point index 182, and therefore the high pressure signal output line 186 is returned from +5 V to zero voltage status. When the pressure drops to the set low pressure point, the pressure index 14 touches the low pressure point index 162, thereby causing the low pressure signal output line to be turned from a zero voltage status to +5 V. By means of the aforesaid action and principle, a fluid pump can be automatically controlled by the aforesaid low pressure signal output line 166 and high pressure signal output line 186 through a simple control circuit. The aforesaid pressure control meter is functional, but it can only be used to control a controlled device (such as a pressure tank) of which the fluid pressure is already set within the range to be controlled, i.e., the pressure control meter cannot control a pressure tank having a zero pressure or a pressure below the set low pressure point. If the pressure index 14 is at the zero pressure position or a position below the set low pressure point, it will touch the low pressure probe 162 of the low pressure point index 16 and be stopped by it when the pump is started to pump the fluid into the pressure tank and the fluid pressure of the pressure tank is continuously increased.

SUMMARY OF THE INVENTION

The present invention has been accomplished to provide an electronic pressure gauge which eliminates the aforesaid problem. It is one object of the present invention to provide an electronic pressure gauge which can be set to automatically control the fluid pressure of a controlled device within a predetermined range. It is another object of the present invention to provide an electronic pressure gauge which can be used to automatically control the fluid pressure of a controlled device whose original fluid pressure is zero or below the set low pressure point. It is still another object of the present invention to provide an electronic pressure gauge which is simple in structure, and easy to manufacture.

According to the preferred embodiment of the present invention, the electronic pressure gauge comprises a housing, a fluid pressure converter for converting the pressure of the test fluid into a voltage, an electronic low pressure point setting device for setting the desired low pressure point, an electronic high pressure point setting device for setting the desired high pressure point, an electronic low pressure point comparator for comparing the set low pressure point with the voltage of the fluid converter, an electronic high pressure point comparator for comparing the voltage of the fluid converter with the set high pressure point, and a control signal output device adapted to provide different output signals subject to the comparison result of the electronic low pressure point comparator and the electronic high pressure point comparator. The output signals of the fluid pressure converter, electronic low pressure point setting device and electronic high pressure setting device are shown by voltage. For example, a fluid pressure of every ten pounds per square inch is equivalent to a voltage of one volt. In case the fluid pressure is 25 pounds per square inch, the fluid converter provides a 5 V output voltage. When to set the low pressure point at 20 pounds per square inch, it can be made through a variable resistor to let the electronic low pressure point setting device provide a 2 V output voltage. By comparing both voltages, the level of the current fluid pressure relative to the set low pressure point is measured. Further, the output voltages of the fluid converter, electronic low pressure point setting device and electronic high pressure setting device are converted into a respective digital signal by a respective voltage to digital converter, and then shown through a respective display.

DETAILED DESCRIPTION OF THE PREFERRED EMBODIMENT

Figure 1:
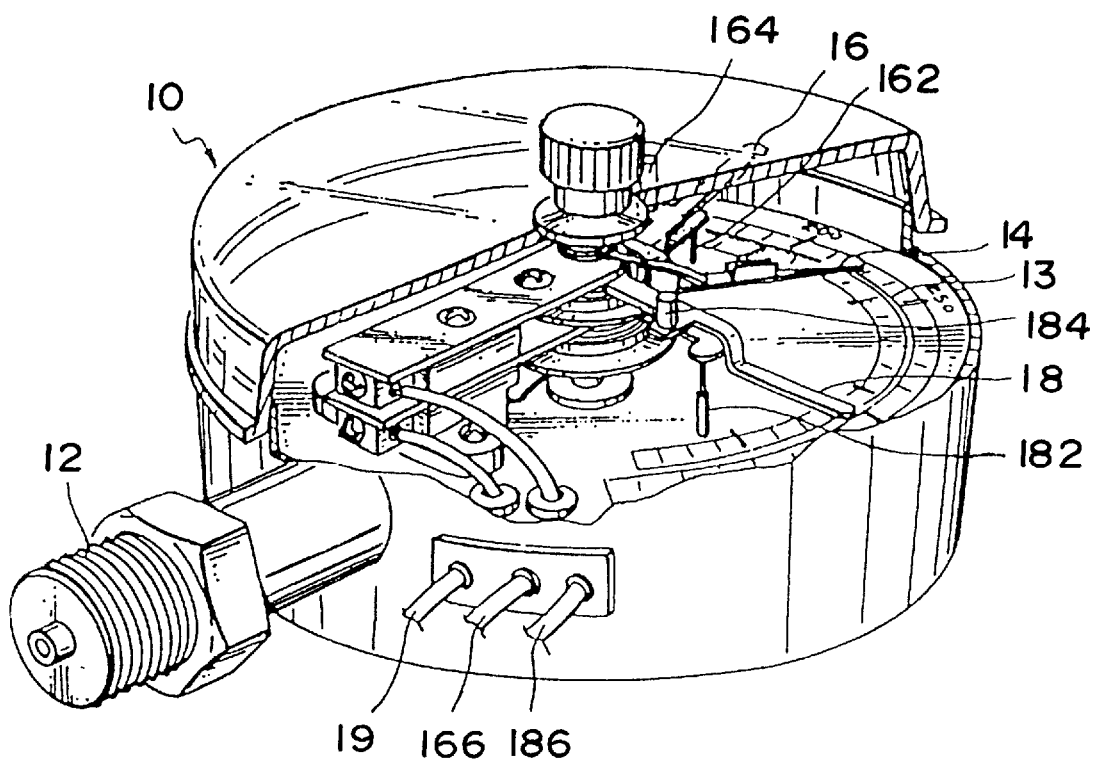
FIG. 1 is a cutaway of a pressure control meter according to the prior art.
Figure 2:
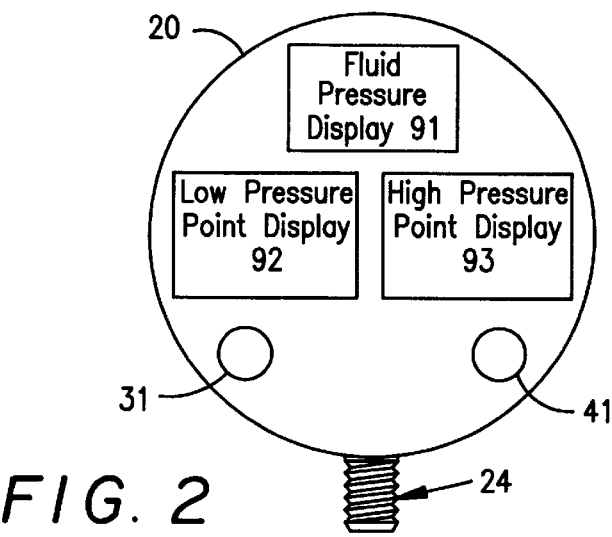
FIG. 2 is a front plain view of an electronic pressure gauge according to the present invention.
Figure 3:
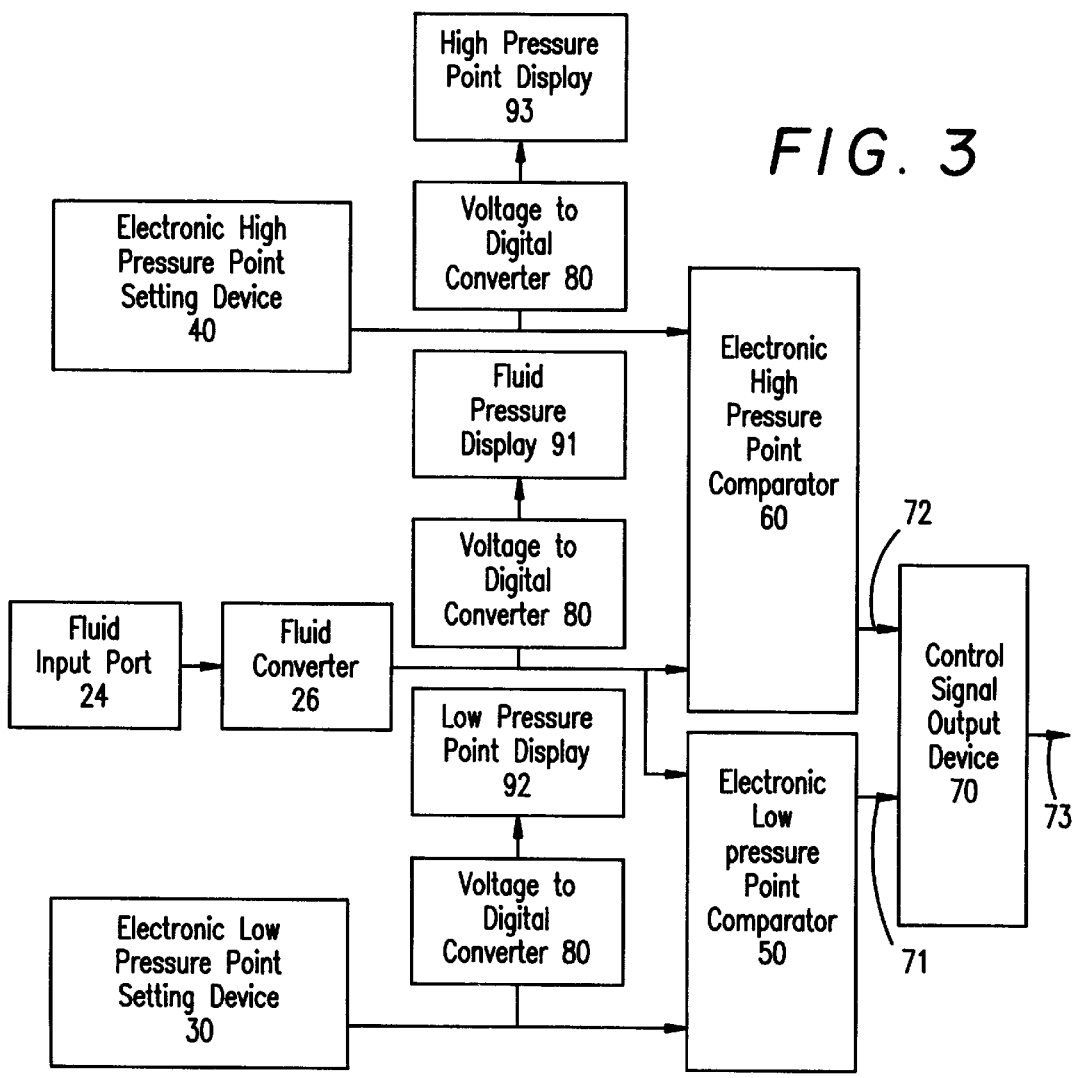
FIG. 3 is a system block diagram of the electronic pressure gauge according to the present invention.

Referring to FIGS. 2 and 3, an electronic pressure gauge in accordance with the present invention is generally comprised of a housing 20 having a fluid input port 24 adapted for receiving a fluid from a fluid supply system. The housing 22 is provided with a digital display unit 91;92;93. The digital display unit 91;92;93 includes a fluid pressure display 91 for indicating the pressure of the test fluid, a low pressure point display 92 for indicating the value of a set low pressure point, and a high pressure point display 93 for indicating the value of a set high pressure point. These displays 91;92;93 can be liquid crystal displays or LED type displays.

A low pressure point adjustment device 31 and a high pressure point adjustment device 41 are respectively installed in the housing 20 corresponding to the low pressure point display 92 and the high pressure point display 93. Through the low pressure point adjustment device 31 and the high pressure point adjustment device 41, the user can set the desired low pressure point and high pressure point. During setting, corresponding values are shown through the low pressure point display 92 and the high pressure point display 93.

The electronic circuit of the electronic pressure gauge processes the values of the fluid pressure and compares the values of the set low pressure point and high pressure point by voltage. FIG. 3 shows the control signal logic of the electronic pressure gauge. When the test fluid enters the fluid input port 24, the pressure of the test fluid is converted into a voltage by a fluid pressure converter 26. The fluid pressure converter 26 is obtained for example from ADP series of National Electric Japan, which uses pressure resistors SR1–SR4 (shown in FIG. 4) to change its output voltage, and its output voltage is directly proportional to the pressure of the test fluid.

The electronic low pressure point setting device 30 is for the user to set the desired low pressure point, and its output is made by voltage. The electronic high pressure point setting device 40 is for the user to set the desired low pressure point, and its output is made by voltage.

The fluid pressure, the set low pressure point and the set high pressure point are indicated by means of voltage. Voltage to digital converters 80 are provided to convert the voltage of the fluid pressure, the voltage of the set low pressure point and the voltage of the set high pressure point to corresponding digital signals readable to the fluid pressure display 91, low pressure point display 92 and high pressure point display 93 of the digital display unit 90. Therefore, the detected fluid pressure, the set low pressure point and the set high pressure point are respectively shown through the fluid pressure display 91, the low pressure point display 92 and the high pressure point display 93. The voltage to digital converter has the function of a decoder. It can be obtained for example from ICL7106 or ICL7107 of Intersil.

The electronic low pressure point comparator 50 is adapted to compare the fluid pressure with the set low pressure point. When the fluid pressure is lower than the set low pressure point, the electronic low pressure point comparator 50 outputs a first signal. When the fluid pressure is higher than the set low pressure point, the electronic low pressure point comparator 50 outputs a second signal. The aforesaid first signal and second signal means that the electronic low pressure point comparator 50 can provide two different signals.

The electronic high pressure point comparator 60 is adapted to compare the fluid pressure with the set high pressure point. When the fluid pressure is lower than the set high pressure point, the electronic high pressure point comparator 60 outputs a first signal. When the fluid pressure is higher than the set high pressure point, the electronic high pressure point comparator 50 outputs a second signal.

The output signals of the aforesaid electronic low pressure point comparator 50 and electronic high pressure point comparator 60 are respectively connected to a first input end 71 and a second input end 72 of a control signal output device 70.

Figure 4:
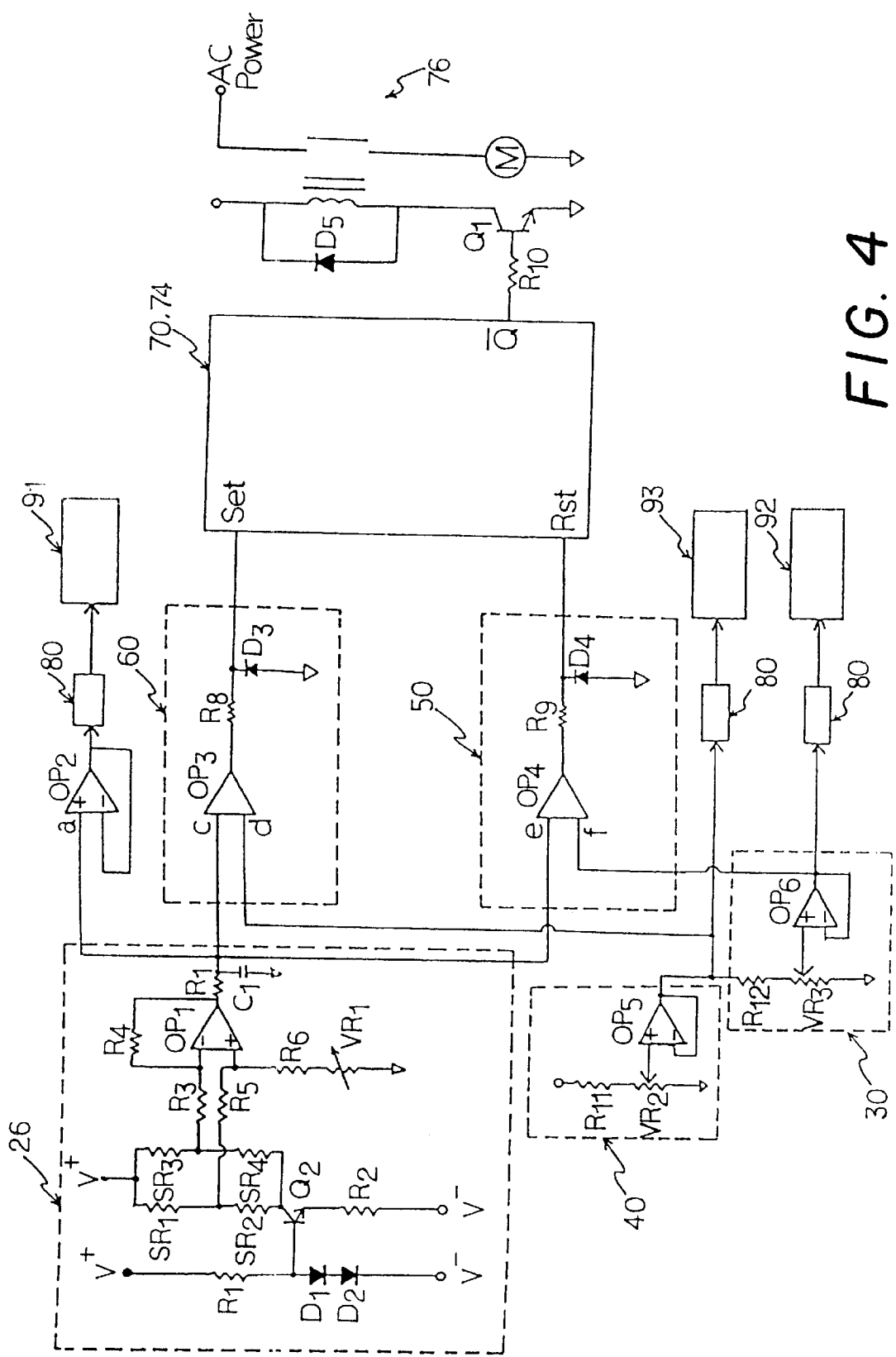
FIG. 4 is a circuit diagram of the electronic pressure gauge according to the present invention.

FIG. 4 is a circuit diagram showing details of the circuitry illustrated in FIG. 3, and SR1 to SR4, in which R1 to R12 and SR1 to SR4 are resistors, VR1 to VR3 are variable resistors, D1 to D5 are diodes, Q1 and Q2 are transistors, OP1 to OP6 are operation amplifiers, and M is a fluid pump.

The electronic low pressure point setting device 30 achieves voltage output through the third variable resistor VR3. When the low pressure point is set at relatively higher level, the output voltage of the electronic low pressure point setting device 30 will be relatively higher, i.e., the output voltage of the electronic low pressure point setting device 30 is directly proportional to the low pressure point to be set. The output voltage of the electronic low pressure point setting device 30 is connected to point f of the fourth operation amplifier OP4. In the same manner, the output voltage of the electronic high pressure point setting device 40 is set through the second variable resistor VR2 and connected to point d of the third operation amplifier OP3. The output voltage of the fluid pressure converter 26 is respectively connected to point a of the second operation amplifier OP2, point c of the third operation amplifier OP3 and point e of the fourth operation amplifier OP4.

The electronic low pressure point comparator 50 and the electronic high pressure point comparator 60 achieve their respective pressure point detecting functions through the third operation amplifier OP3 and the fourth operation amplifier OP4. The control signal output device 70 uses a flip-flop 74 to achieve its function.

The control method and control result of the circuit is outlined hereinafter. Assume a fluid pressure of 10 pounds/square inch equivalent to a voltage of one volt, the low pressure point is set at 20 pounds/square inch and the high pressure point is set at 30 pounds/square inch, thus the point f of the fourth operation amplifier OP4 is 2 volts and the point d of the third operation amplifier OP3 is 3 volts. Further, logic circuit 0 and 1 are used to indicate different status of the input and output of flip-flop 74.

At the first step: When the fluid pressure is zero, the voltage is zero too, and the point a of the second operation amplifier OP2 and the point c of the third operation amplifier OP3 are 0 volt, therefore the second input end 72, namely, the set end of the flip-flop 74 is 0, the first input end 71, namely, the reset end of the flip-flop 74 is 1, and the output end 73 (Q bar) of the control signal output device 70 is 1. When the output end 73 of the control signal output device 70 is 1, a relay 76 is turned on to start the fluid pump M.

At the second step: When the fluid pressure surpasses the set low pressure point of 20 pounds/square inch, the set end as well as reset end of the flip-flop 74 are 0, therefore the status of the output end 73 remains unchanged, and the fluid pump M is continuously operated.

At the third step: When the fluid pressure surpasses the set high pressure point of 30 pounds/square inch, the set end of the flip-flop 74 is turned to 1 and its reset end is still maintained at 0, therefore the output end 73 is turned to 0, and the relay 76 is cut off, causing the fluid pump M to stop.

At the fourth step: When the fluid pressure drops blow the set high pressure point of 30 pounds/square inch a certain length of time after stop of the fluid pump M, the set end of the flip-flop 74 is turned to 0 and its reset end is remained at 0, therefore the output end 73 is remained unchanged, and the fluid pump M does no work.

At the fifth step: When the fluid pressure drops below the set low pressure point of 20 pounds/square inch, the set end of the flip-flop 74 is maintained at 0, however the reset end of the flip-flop 74 is turned from 0 to 1, therefore the relay 76 is turned on to start the fluid pump M again.

After the fifth step, the procedure is returned to the second step again, permitting the fluid pressure to be controlled with a certain range.

As indicated above, the present invention provides an electronic pressure gauge which enables the user to control the pressure of a fluid within the desired range. For example, the present invention can be used to control a pressure tank. When the pressure of the pressure tank is at zero or a low level, a fluid pump is automatically started to pump a fluid into the pressure tank, and the fluid pump is automatically stopped when the pressure of the pressure tank reaches the set range. When the pressure of the pressure tank drops below a predetermined low level point, the fluid pump is started to pump the fluid into the pressure tank again.

The aforesaid digital display unit can be a single display device for indicating the fluid pressure, the set low pressure point and the set high pressure point. In this case, a selector switch (not shown) must be provided. Therefore, through the selector switch, the user can control the display to show the fluid pressure, the set low pressure point, or the set high pressure point.

Further, an indicator light may be installed to show the normal function status (for example, power normal) of the electronic pressure gauge; the control signal output device 70 can be a microprocessor or an equivalent circuit instead of the aforesaid flip-flop.

While only one embodiment of the present invention has been shown and described, it will be understood that various modifications and changes could be made thereunto without departing from the spirit and scope of the invention disclosed.

What the invention claimed is:

1. An electronic pressure gauge comprising:

a housing having a fluid input port adapted for receiving the fluid to be measured;

a fluid pressure converter mounted in said housing and adapted to convert the pressure of the fluid into a voltage;

an electronic low pressure point setting device mounted in said housing and adapted for setting a predetermined low pressure point and providing a voltage output corresponding to the set low pressure point;

an electronic high pressure point setting device mounted in said housing and adapted for setting a predetermined high pressure point and providing a voltage output corresponding to the set high pressure point;

an electronic low pressure point comparator mounted in said housing and adapted to receive the output voltage of said fluid pressure converter and the output voltage of said electronic low pressure point setting device and to compare both output voltages, said electronic low pressure point comparator providing a first output signal when the output voltage of said fluid pressure converter is lower than the output voltage of said electronic low pressure point setting device, or a second output signal when the output voltage of said fluid pressure converter is equal to or higher than the output voltage of said electronic low pressure point setting device;

an electronic high pressure point comparator mounted in said housing and adapted to receive the output voltage of said fluid pressure converter and the output voltage of said electronic high pressure point setting device and to compare both output voltages, said electronic high pressure point comparator providing a third output signal when the output voltage of said fluid pressure converter is lower than the output voltage of said electronic high pressure point setting device, or a fourth output signal when the output voltage of said fluid pressure converter is equal to or higher than the output voltage of said electronic high pressure point setting device;

voltage to digital converter means adapted to convert the output voltages of said fluid pressure converter, said electronic low pressure point setting device and said electronic high pressure point setting device into corresponding digital signals;

display means adapted to indicate the digital signals from said voltage to digital converter; and a control signal output device having a first input end adapted to receive the output signal of said electronic low pressure comparator, a second input end adapted to receive the output signal of said electronic high pressure comparator, and an output end adapted for providing an output signal to a fluid supply control system to control its operation;

wherein said control signal output device provides a fifth output signal when the pressure of the fluid is lower than the set high pressure point of said electronic high pressure point setting device; and wherein when the fluid pressure is zero, said control signal output device provides said fifth output signal to turn on said fluid supply control system; when the fluid pressure surpasses the set low pressure point, said control signal output device keeps providing said fifth output signal to said fluid supply control system; when the fluid pressure surpasses the set high pressure point, said control signal output device provides a sixth output signal to turn off said fluid supply control system; when the fluid pressure drops below the set high pressure point, said control signal output device keeps providing said sixth output signal to said fluid supply control system, and therefore said fluid supply control system does no work; when the fluid pressure drops below the set low pressure point, said control signal output device provides said fifth output signal to said fluid supply control system, causing it to be turned on.

2. The electronic pressure gauge of claim 1 wherein said electronic low pressure setting device and said electronic high pressure setting device comprise a respective variable resistor for setting the desired low pressure point and the desired high pressure point.

3. The electronic pressure gauge of claim 1 wherein said electronic low pressure point comparator and said electronic high pressure point comparator comprise a respective operational amplifier.

4. The electronic pressure gauge of claim 1 wherein said control signal output device comprises a flip-flop having a reset end connected to the first input end of said control signal output device and a set end connected to the second input end of said control signal output device.

* * * * *